(12) United States Patent
Ahn et al.

(10) Patent No.: US 11,144,810 B2
(45) Date of Patent: Oct. 12, 2021

(54) ENHANCED VISUAL DIALOG SYSTEM FOR INTELLIGENT TUTORS

(71) Applicant: International Business Machines Corporation, Armonk, NY (US)

(72) Inventors: Jae-Wook Ahn, Nanuet, NY (US); Maria D. Chang, Irvington, NY (US); Sharad Sundararajan, Yorktown Heights, NY (US); Patrick D. Watson, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 931 days.

(21) Appl. No.: 15/634,451

(22) Filed: Jun. 27, 2017

(65) Prior Publication Data

US 2018/0373974 A1    Dec. 27, 2018

(51) Int. Cl.
| | | |
|---|---|---|
| *G09B 7/08* | (2006.01) | |
| *G06N 3/00* | (2006.01) | |
| *G06N 20/00* | (2019.01) | |
| *G06Q 10/10* | (2012.01) | |

(52) U.S. Cl.
CPC .............. *G06N 3/006* (2013.01); *G06N 20/00* (2019.01); *G06Q 10/10* (2013.01); *G09B 7/08* (2013.01)

(58) Field of Classification Search
CPC .......... G06N 3/006; G06N 20/00; G06N 3/00; G06Q 10/10; G09B 7/08
See application file for complete search history.

(56) References Cited

U.S. PATENT DOCUMENTS

| | | |
|---|---|---|
| 8,602,793 B1 | 12/2013 | Sniedzins |
| 9,892,208 B2 | 2/2018 | Anastasakos et al. |
| 2004/0111272 A1 | 6/2004 | Gao et al. |
| 2011/0066998 A1 | 3/2011 | Scandura |
| 2011/0129808 A1 | 6/2011 | Srivastava |
| 2015/0286747 A1 | 10/2015 | Anastasakos et al. |
| 2017/0132528 A1 | 5/2017 | Aslan et al. |

(Continued)

FOREIGN PATENT DOCUMENTS

CN    106506213 A    3/2017

OTHER PUBLICATIONS

Wickham, A layered Grammar of Graphics, 2010, American Statistical Association, Institute of Mathematical Statistics, and Interface Foundation of North America Journal of Computational and Graphical Statistics, vol. 19, No. 1, pp. 3-28 (Year: 2010).*

(Continued)

*Primary Examiner* — Li Wu Chang
(74) *Attorney, Agent, or Firm* — Patterson + Sheridan, LLP (57) ABSTRACT

Systems, methods, and computer program products to perform an operation comprising receiving text input via a chat interface of a tutor application, identifying, by at least one classifier applied to the text input, a concept in the text input, mapping the concept in the text input to at least one of a visual action and a first visual object, generating, based on a first machine learning (ML) model, a first program code statement corresponding to the at least one of the visual action and the first visual object, and executing the first program code statement to modify a visualization interface of the tutor application based on the text input received via the chat interface.

20 Claims, 10 Drawing Sheets

(56) References Cited

U.S. PATENT DOCUMENTS

2018/0054523 A1* 2/2018 Zhang ................ G06N 5/04
2018/0247549 A1* 8/2018 Martin .............. G06F 40/30

OTHER PUBLICATIONS

Gelu Vac, ABC to Handling Visual Objects using Javascript, 2012, https://www.codeproject.com/Articles/19584/ABC-to-Handling-Visual-Objects-using-Javascript (Year: 2012).*
PCT Notification of Transmittal of the International Search Report and The Written Opinion of the International Searching Authority, or the Declaration for Application No. PCT/IB2018/054034, dated Sep. 29, 2018.

* cited by examiner

FIG. 1

PSYCHOLOGY CONCEPT MAP — 202

- SHORT TERM MEMORY — 204
- SENSORY R — 207
- NON-DECLARATIVE MEMORY — 206
- LONG TERM MEMORY — 205
- DECLARATIVE MEMORY — 203

[CLICK NODE] SHOW QUESTIONS
[HOVER NODE] SHOW NODE LABELS

---

201 —

CHAT ENGINE: HI STUDENT 1, LET'S TRY ANSWERING THIS QUESTION.
HOW ARE LONG-TERM MEMORIES ENCODED?

A) SOUNDS
B) VISUAL IMAGES
C) MEANINGS OF WORDS AND CONCEPTS
D) ALL OF THE ABOVE

STUDENT1: A) SOUNDS

TYPE HERE...

CHAT ENGINE: HI STUDENT 1, LET'S TRY
ANSWERING THIS QUESTION.
HOW ARE LONG-TERM MEMORIES ENCODED?

M) SOUNDS
N) VISUAL IMAGES
O) MEANINGS OF WORDS AND CONCEPTS
P) ALL OF THE ABOVE

STUDENT1: A) SOUNDS

CHAT ENGINE: SORRY, THAT'S INCORRECT. WE'VE
HIGHLIGHTED THE CONCEPTS TO THE RIGHT TO
HELP YOU FOR LEARN HOW LONG-TERM MEMORIES
ARE ENCODED

CHAT ENGINE: USER STUDENT 1 CHANGED THE
COLOR OF THE LONG-TERM MEMORY CONCEPT NODE.

STUDENT1: PLEASE SHOW ME
SOME INFORMATION ON SHORT TERM MEMORY

---

PSYCHOLOGY CONCEPT MAP — 202

- 204 SHORT TERM MEMORY
- 207 SENSORY R / SENSORY MEMORY
- 206 NON-DECLARATIVE MEMORY
- 205 LONG TERM MEMORY
- 203 DECLARATIVE MEMORY

[CLICK NODE] SHOW QUESTIONS
[HOVER NODE] SHOW NODE LABELS

ENHANCED VISUAL DIALOG SYSTEM FOR INTELLIGENT TUTORS

BACKGROUND

The present disclosure relates to computer software, and more specifically, to computer software which provides an enhanced visual dialog interface for intelligent tutors.

Intelligent tutor systems provide learning experiences to users without requiring intervention from a human teacher. Some intelligent tutors provide a text-based communication interface, allowing users to chat with the intelligent tutor (and vice versa) via text. However, other components (such as graphical learning interfaces) of the intelligent tutor system are isolated from the text-based user communications. Similarly, when the users interact with other components of the system, the text-based communication interface is isolated from the interaction.

SUMMARY

In one embodiment, a method comprises receiving text input via a chat interface of a tutor application, identifying, by at least one classifier applied to the text input, a concept in the text input, mapping the concept in the text input to at least one of a visual action and a first visual object, generating, based on a first machine learning (ML) model, a first program code statement corresponding to the at least one of the visual action and the first visual object, and executing the first program code statement to modify a visualization interface of the tutor application based on the text input received via the chat interface.

In another embodiment, a system comprises a processor and a memory storing instructions, which when executed by the processor, performs an operation comprising receiving text input via a chat interface of a tutor application, identifying, by at least one classifier applied to the text input, a concept in the text input, mapping the concept in the text input to at least one of a visual action and a first visual object, generating, based on a first machine learning (ML) model, a first program code statement corresponding to the at least one of the visual action and the first visual object, and executing the first program code statement to modify a visualization interface of the tutor application based on the text input received via the chat interface.

In another embodiment, a computer-readable storage medium has computer-readable program code embodied therewith, the computer-readable program code executable by a processor to perform an operation comprising receiving text input via a chat interface of a tutor application, identifying, by at least one classifier applied to the text input, a concept in the text input, mapping the concept in the text input to at least one of a visual action and a first visual object, generating, based on a first machine learning (ML) model, a first program code statement corresponding to the at least one of the visual action and the first visual object, and executing the first program code statement to modify a visualization interface of the tutor application based on the text input received via the chat interface.

DETAILED DESCRIPTION

Embodiments disclosed herein provide an enhanced intelligent tutor system that improves communication between users and different components of the intelligent tutor. For example, when users issue text-based statements via a text-based communication interface of the intelligent tutor, embodiments disclosed herein dynamically generate a corresponding statement that modifies a visualization interface of the intelligent tutor. Similarly, if the user modifies a graphical element of the visualization interface, embodiments disclosed herein generate a natural language statement that is provided to the text-based communication interface of the intelligent tutor.

Figure 1:
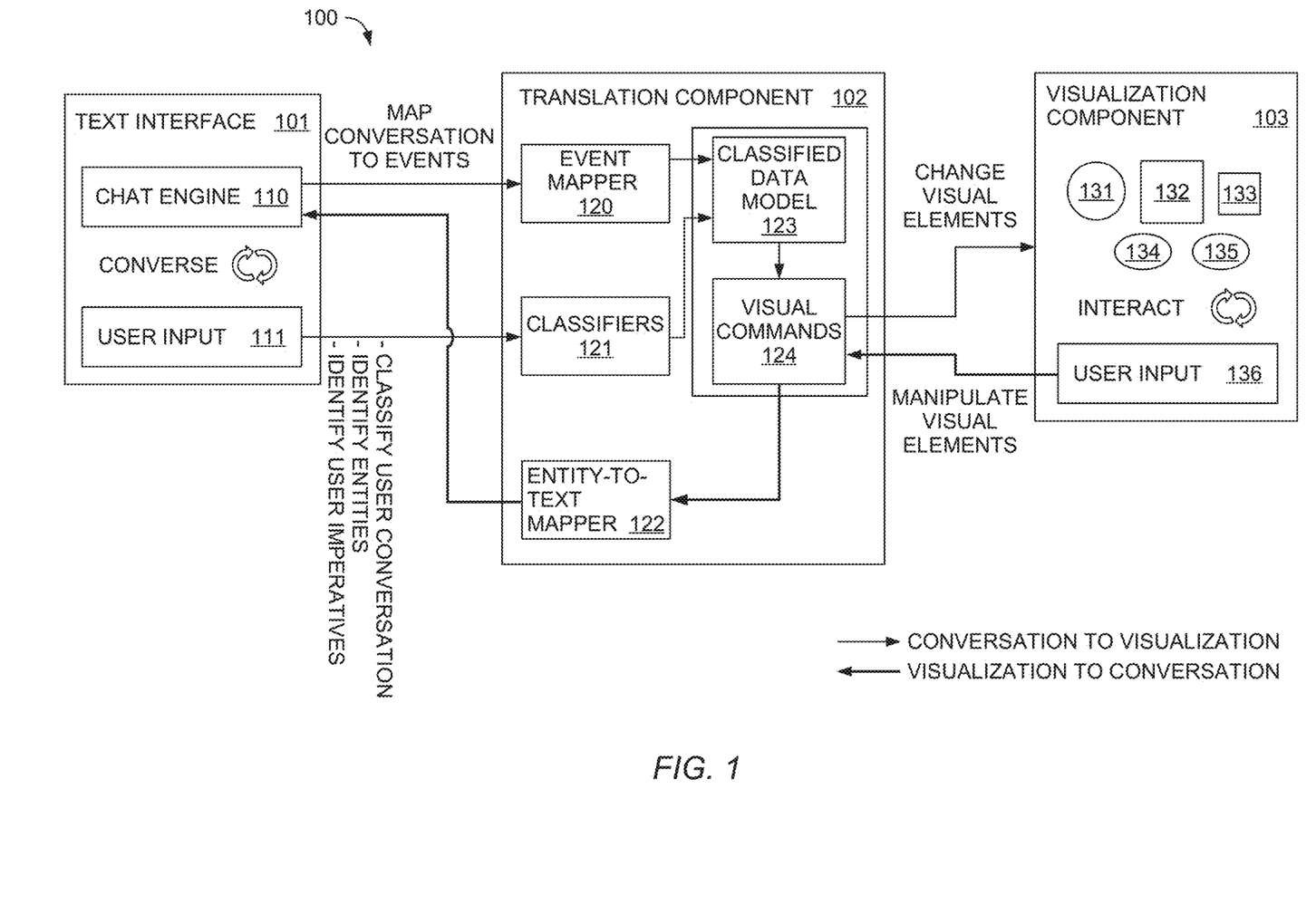
FIG. 1 illustrates example components of an intelligent tutor system that provides an enhanced visual dialog interface, according to one embodiment.

FIG. 1 illustrates example components of an intelligent tutor system 100 that provides an enhanced visual dialog interface, according to one embodiment. Generally, an intelligent tutor is an application configured to provide a virtual learning environment for users. As shown, the intelligent tutor 100 includes a text interface 101, a translation component 102, and a visualization component 103. The text interface 101 provides a text-based communication channel between a user and a chat engine 110. Generally, the chat engine 110 is a "bot" that converses with the user via text, emoticons, icons, and the like. For example, the chat engine 110 may output a multiple choice question to a user. The user may then provide user input 111 specifying an answer. The chat engine 110 may then validate the answer provided in the user input 111, and return a result of the validation (e.g., whether the user's answer is correct or incorrect). In such a manner, the chat engine 110 and user can converse while the user receives learning instruction from the intelligent tutor 100.

The visualization component 103 is configured to output graphical learning elements, such as the example graphical learning elements 131-135, for display. The example graphical learning elements include any type of graphical object, such as diagrams, graphs, schematics, clickable concept nodes, and the like. As shown, a user may interact with the graphical learning elements 131-135 via user input 136. For example, a user may change the color of one or more of the graphical learning elements 131-135 to reflect their level of comfort with the subject matter associated with each respective graphical learning element 131-135.

The translation component 102 is generally configured to enhance the text interface 101 and the visualization component 103. For example, if the user input 111 in the text interface 101 specifies to "show me a green circle", the translation component 102 would generate a program code statement which, when processed by the visualization component 103, generates, renders, and outputs the requested green circle. As another example, if the user input 136 moves one of the graphical learning elements 131-135 to a new location, the translation component 102 receives a program code statement describing the movement, and generates a natural language statement reflecting the movement (e.g., "you have moved the object"), which is then outputted via the text interface 101.

As shown, the translation component 102 includes an event mapper 120, one or more classifiers 121, an entity-to-text mapper 122, a classified data model 123, and a data store of visual commands 124. The event mapper 120 maps text outputted by the chat engine 110 to events and/or concepts. Generally, the conversation between the chat engine 110 and the user may include multiple stages (e.g., question, answer, search, suggestions, comparisons, etc.). The event mapper 120 maps the text to such events. For example, if a user provides a correct answer to a question in the text interface, the event mapper would map a response from the chat engine 110 to an example concept of "correct answer". The classifiers 121 are representative of natural language classifiers, natural language processing algorithms, and language parsers, such as a parser which identifies user imperatives (or commands). Generally, the classifiers 121 analyze the text of the user input 111 to classify the text of the conversation and identify any entities in the text of the conversation (e.g., people, places, things, learning concepts, etc.). The classifiers 121 then provide the classified data to the classified data model 123, which is a machine learning model that generates a visual command 124 based on the classified data. The visual commands 124 are code statements that are executable by the visualization component 103 to modify the user interface accordingly. The code statements may be in any type of programming language designed for visual outputs, such as R (e.g. ggplot2), JavaScript, MATLAB, or any other language based on the grammar of graphics. An example code statement for generating a scatter plot in a graph is "ggplot(data, aes(x=my_x, y=my_y))+geom_point(shape=1)". More generally, therefore, the classifiers 121 are trained on such example statements to produce classifications on responses to an open-ended number of input queries.

When user input 136 is received by the visualization component 103, a visual command 124 (e.g., a code statement) is generated to describe and effectuate the user input 136. For example, if the user changes the shape of the circle 131 to a square, a visual command 124 code statement is generated by the visualization component 103, which, when executed, changes the shape of the circle 131 to a square. Such a code statement may also be in any type of programming language, such as R (e.g. ggplot2), JavaScript, MATLAB, or any other language based on the grammar of graphics. The visual commands 124 are then provided to the translation component 102, which then applies the entity-to-text mapper 122 to the received visual commands 124. The entity-to-text mapper 122 is a machine learning model that generates a natural language statement based on a received visual command 124. For example, the entity-to-text mapper 122 may generate the natural language statement "you changed the circle to a square" responsive to the code statement which changed the circle 131 to a square. The entity-to-text mapper 122 may then provide the natural language statement to the chat engine 110, which outputs the natural language statement to the user via the text interface 101.

Figure 2A:
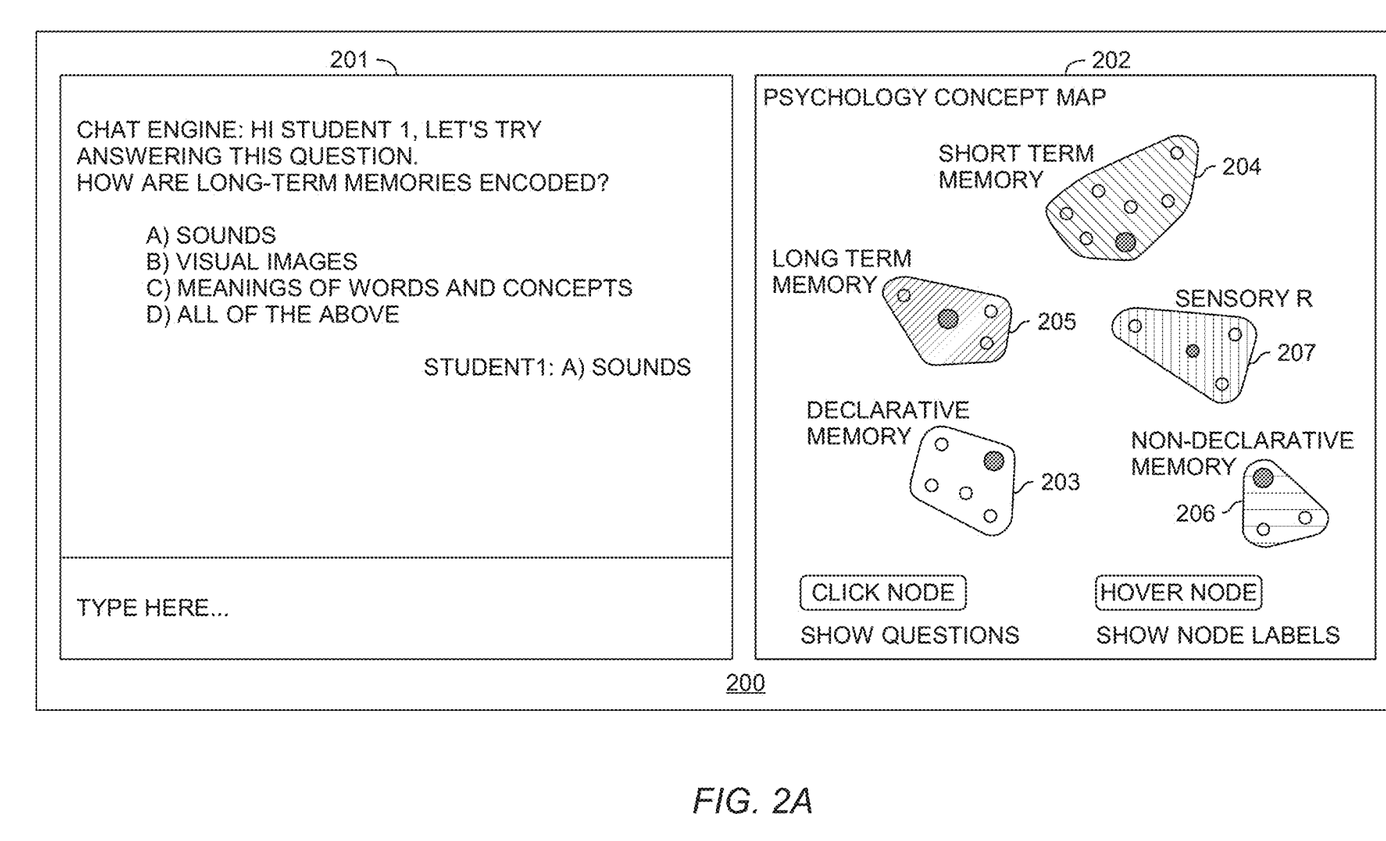
FIGS. 2A-2D depict examples of enhanced visual dialog interfaces for intelligent tutors, according to various embodiments.

FIG. 2A depicts an example graphical user interface (GUI) 200 which includes enhanced visual dialogs provided by the intelligent tutor 100, according to one embodiment. As shown, the GUI 200 includes a chat interface 201 and a visualization interface 202. The chat interface 201, an example output of the text interface 101, is a GUI that allows a user and the chat engine 110 to communicate via text and other symbols. The visualization interface 202 is a GUI generated by the visualization component 103 that outputs graphics objects used to facilitate user learning.

As shown, the chat engine 110 has presented a multiple choice question to an example user "student1" via the chat interface 201. The multiple choice question is related to long-term memories. Furthermore, as shown, the visualization interface 202 presents the user with a plurality of concept nodes 203-207 that are related to the human memory. The user may click on one of the concept nodes 203-207 to receive information related to each concept, such as tutorials, diagrams, and the like. As shown, the user "student1" has submitted a response to the multiple choice question via the chat interface 201.

Figure 2B:
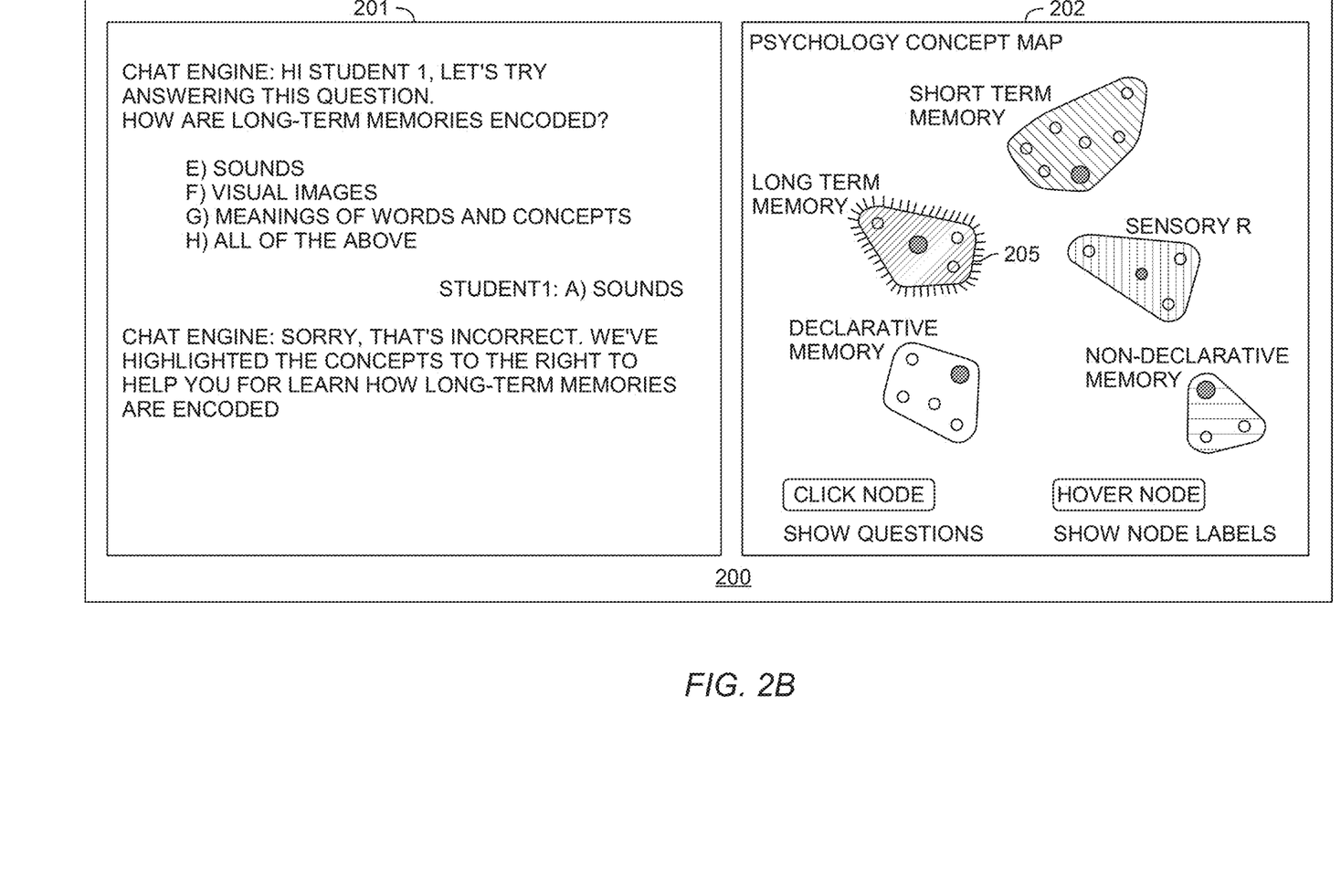

FIG. 2B depicts an example output of the GUI 200 after the intelligent tutor 100 determines that the multiple choice response provided by the user "student1" is incorrect. As shown, the chat interface 201 includes a text response from the chat engine 110 indicating the response is incorrect. However, as shown, the GUI 202 has been updated to highlight the concept node 205, as this concept node corresponds to the concept of "long term memory", which is a topic of conversation in the chat interface 201. As previously indicated, the text of the chat interface 201 is analyzed by the classifiers 121, which includes natural language classifiers, natural language processors, and other types of parsers. Similarly, the chat engine 110 provides text of the conversation to the event mapper 120, which maps the text to a corresponding event. In the example depicted in FIG. 2B, the event mapper 120 may map the text of the conversation to the event of "incorrect answer", as the user provided an incorrect answer to the multiple choice question. Similarly, the classifiers 121 may classify the input provided by the user to determine that the user needs a better understanding of the concept "long term memory". As such, the classified data model 123 may generate a code statement (e.g., a visual command 124) based on the text of the chat interface 201 that specifies to highlight the concept node 205. The code statement, when executed by the visualization component 103, highlights the concept node 105 in the GUI 202.

Figure 2C:
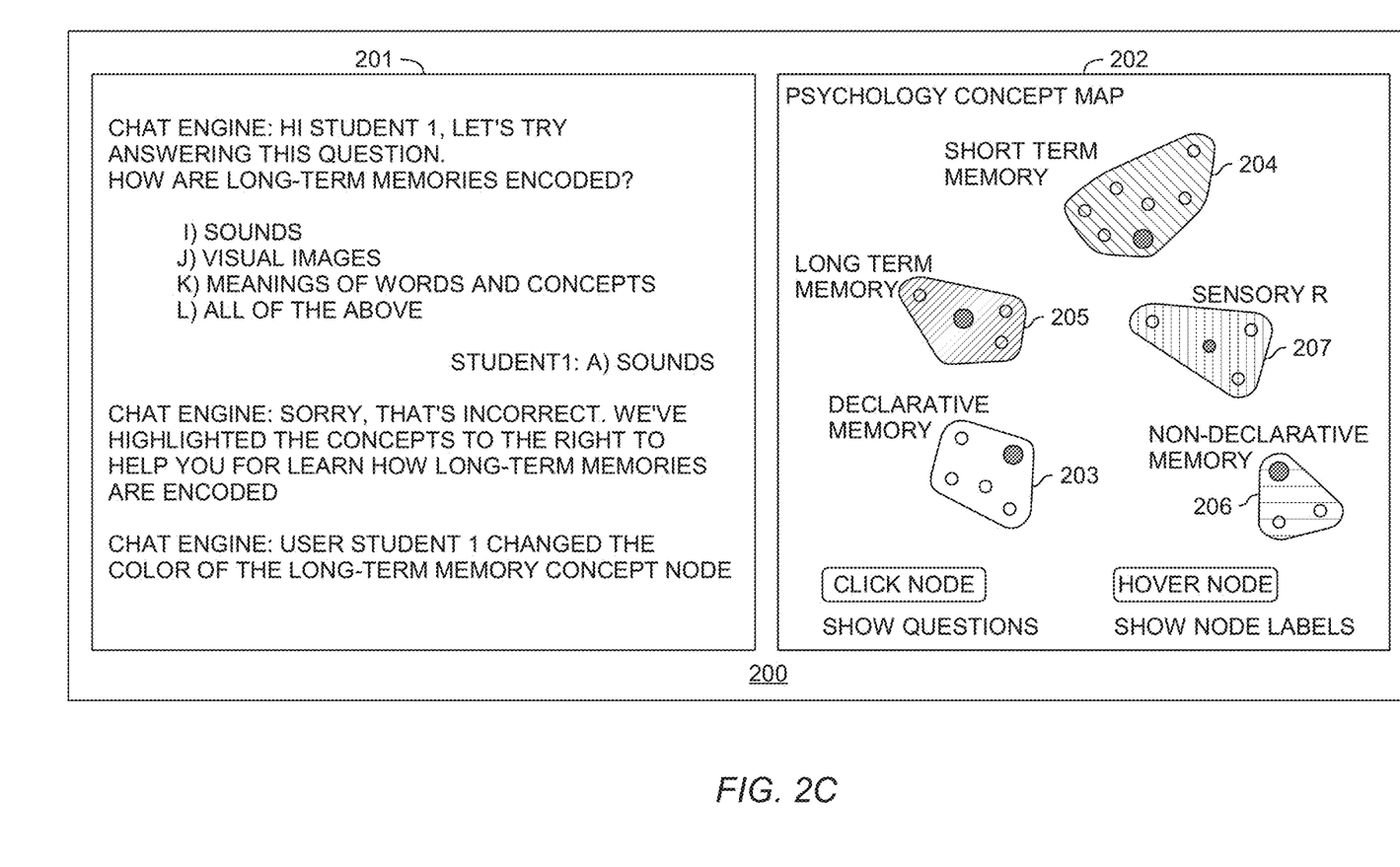

FIG. 2C depicts an embodiment where the user "student1" has modified the GUI 202. Specifically, the user "student1" has changed the color (or shading) of the concept node 205, e.g., reflecting that the user has reviewed the corresponding tutorials and is more comfortable with the concept of long term memories. To effectuate the change, the visualization component 103 generates and executes a code statement which modifies the appearance of the concept node 205. The visualization component 103 provides the code statement to the translation component 102. The visual commands 124 then provide the code statement to the entity-to-text mapper 122, which generates a natural language statement corresponding to the code statement. The natural language statement is then outputted in the chat interface 201. Therefore, as shown, the chat interface 201 depicts the chat engine 110 as outputting the example natural language statement of "User student1 changed the color of the long-term memory concept node." While changing the color of the concept node 205 is an example of user input manipulating the GUI 202, any type of user interaction is similarly processed. For example, if the user moved the concept node 203 to a different location, the translation component 102 may generate an example natural language statement of "user student1 moved the concept node associated with declarative memory."

Figure 2D:
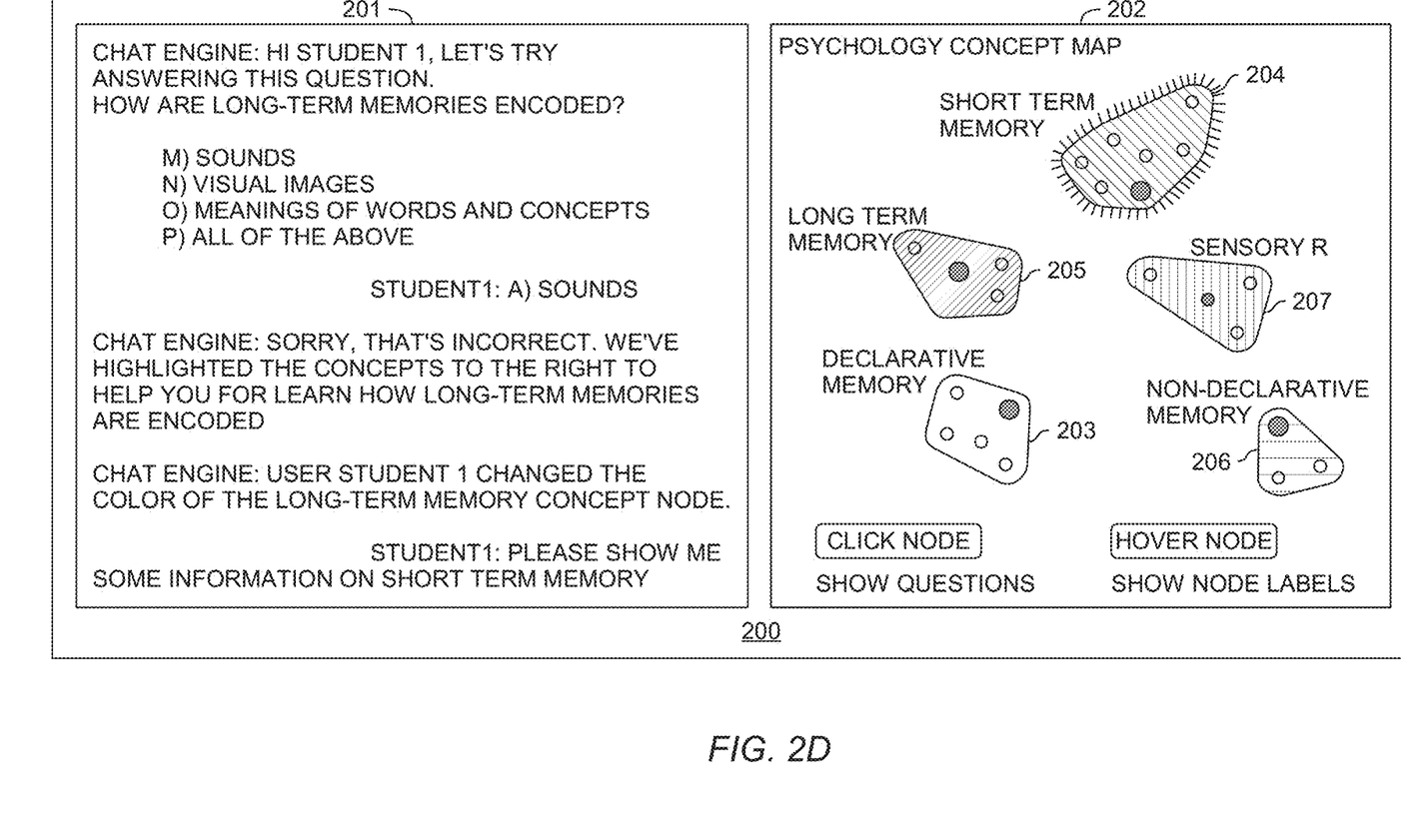

FIG. 2D depicts an embodiment where the user submits an imperative statement to the chat engine 110 via the GUI 201. Specifically, as shown, the user has stated "please show me some information on short term memory." The components of the translation component 102 analyze the statement, and determine that the user has instructed the chat engine 110 to perform some action. In response, the translation component 102 generates a code statement that, when executed by the visualization component 103, highlights the concept node 204 corresponding to short term memory, as reflected in the GUI 202.

In addition to highlighting the concept node 204, the translation component 102 may generate statements that provide hints to users via the GUI 202. Furthermore, the translation component 102 may modify the layout of the GUIs 201, 202 (e.g., side-by-side, the GUI 201 embedded in the GUI 202, etc.). Additionally, the translation component 102 may generate statements which highlight pathways from one visual entity in the GUI 202 to another, such as from a concept node that corresponds to a subject that the user understands, to an answer concept in the graph. Furthermore, the translation component 102 may generate statements which highlight more than one entity in the GUI 202, such as emphasizing concept nodes 204-205 to show the user the differences between short and long-term memory. Furthermore, the intelligent tutor 100 may generate concept nodes that allow a user to read/ingest large amounts of text, or to provide comparisons of combinations of elements on a long list of items where such numbers of combinations would be impractically large to pre-train. Beyond reading the text, the intelligent tutor 100 introduces a visual guide of the knowledge entities contained in the text by identifying concepts in the text, and creating a graph of concept nodes for display in the GUI 202. The graph of concept nodes allows the user to learn about each associated topic by selecting a given node.

Figure 3:
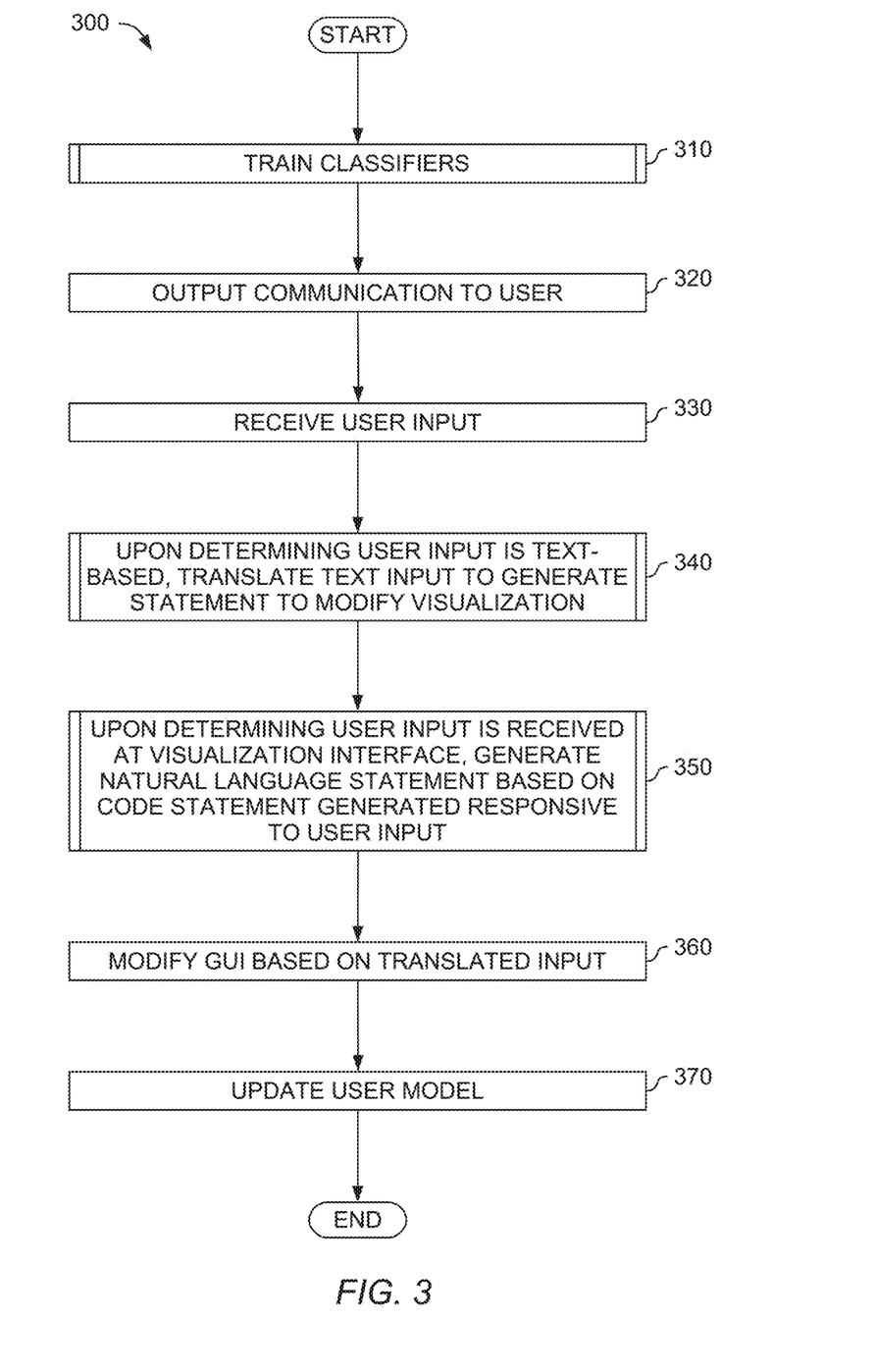
FIG. 3 is a flow chart illustrating an example method to provide an enhanced visual dialog interface for intelligent tutors, according to one embodiment.

FIG. 3 is a flow chart illustrating an example method 300 to provide an enhanced visual dialog system for intelligent tutors, according to one embodiment. As shown, the method 300 begins at block 310 described in greater detail with reference to FIG. 4, where the classifiers 121 are trained. Generally, to train a classifier, labeled input is provided that allows the classifier to compute a desired outcome. For example, the training may provide different natural language statements that have similar concepts (e.g., "show me the green circle", "where is the green circle", "let's see the green circle", etc.). As another example, the training may provide different program code statements (e.g., statements that modify the visualization interface 202) that are labeled to generate corresponding natural language statements. The training of the classifiers 112 may produce one or more machine learning (ML) models which are used to map natural language to code statements to modify the elements of the visualization interface 202, and ML models which map the code statements generated based on user interactions with the visualization interface 202 to natural language statements.

At block 320, the chat engine 110 may output a text communication to the user via the chat interface 201. The text communication may be any type of learning-based communication, such as questions, learning material, and the like. At block 330, the intelligent tutor 100 receives user input. The user input may be received via the chat interface 201 and/or the visualization interface 202. For example, the user may type a response via the chat interface 201 and/or manipulate a graphical object outputted for display via the visualization interface 202. At block 340, upon determining the input is text-based input received via the chat interface, the translation component 102 translates the text input into a code statement to modify the visualization interface 201. For example, if the user types a message stating "I don't understand patents", the translation component 102 may generate a code statement executable by the visualization interface 201 to output a tutorial on patents.

At block 350, upon determining the input is received via the visualization interface 202, the translation component 102 generates a natural language statement based on the code statement generated based on the user input. For example, if the user input specifies to open the tutorial on patents, the visualization interface 202 generates a code statement which outputs the tutorial on patents in the visualization interface 202. The code statement is then translated by the translation component 102 to a natural language statement such as "you opened the tutorial on patents". At block 360, the GUI 200 is modified based on the translated input. For example, the natural language statement "you opened the tutorial on patents" may be outputted via the chat interface 101. As another example, the visualization component 103 may execute the code statement generated by the translation component 102 to modify the visualization interface 202 (e.g., to output the tutorial on patents). At block 370, the translation component 102 may update a machine learning model for the current user. The user ML model considers the input provided by the user, any historical actions reflected an interaction history of the user, and the learning progress of the user. The ML model for the user is then used by the translation component 102 to subsequently modify the visualization interface 202 and/or the chat interface 201.

Figure 4:
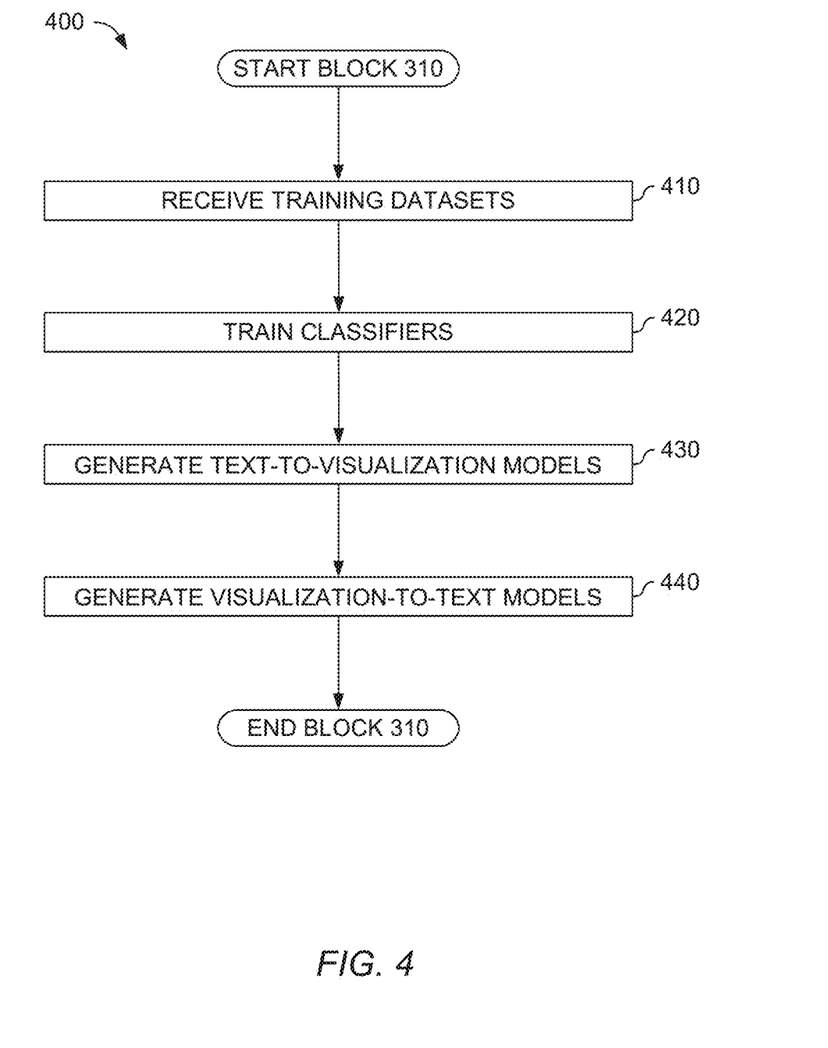
FIG. 4 is a flow chart illustrating an example method to train classifiers, according to one embodiment.

FIG. 4 is a flow chart illustrating an example method 400 corresponding to block 310 to train classifiers, according to one embodiment. As shown, the method 400 begins at block 410, where the translation component 410 receives training datasets, which may optionally include user histories and/or user data. At block 420, the training datasets are used to train the classifiers 121. Generally, the training datasets include labeled input data that include an indication of a "correct" response. For example, the training datasets may include a plurality of different commands, and a corresponding indication of the type of each user command. The training datasets may also include an indication of an appropriate code statement to generate to modify the visualization interface 103 based on the type of each user command. Similarly, the training data may include code statements generated based on user interactions with the graphical elements of the visualization interface 103, an event associated with the interaction, and a natural language statement associated with the event and/or interaction. Based on the training data, the classifiers 121 generate text-to-visualization ML models at block 430. At block 440, the classifiers 121 generate visualization-to-text ML models.

Figure 5:
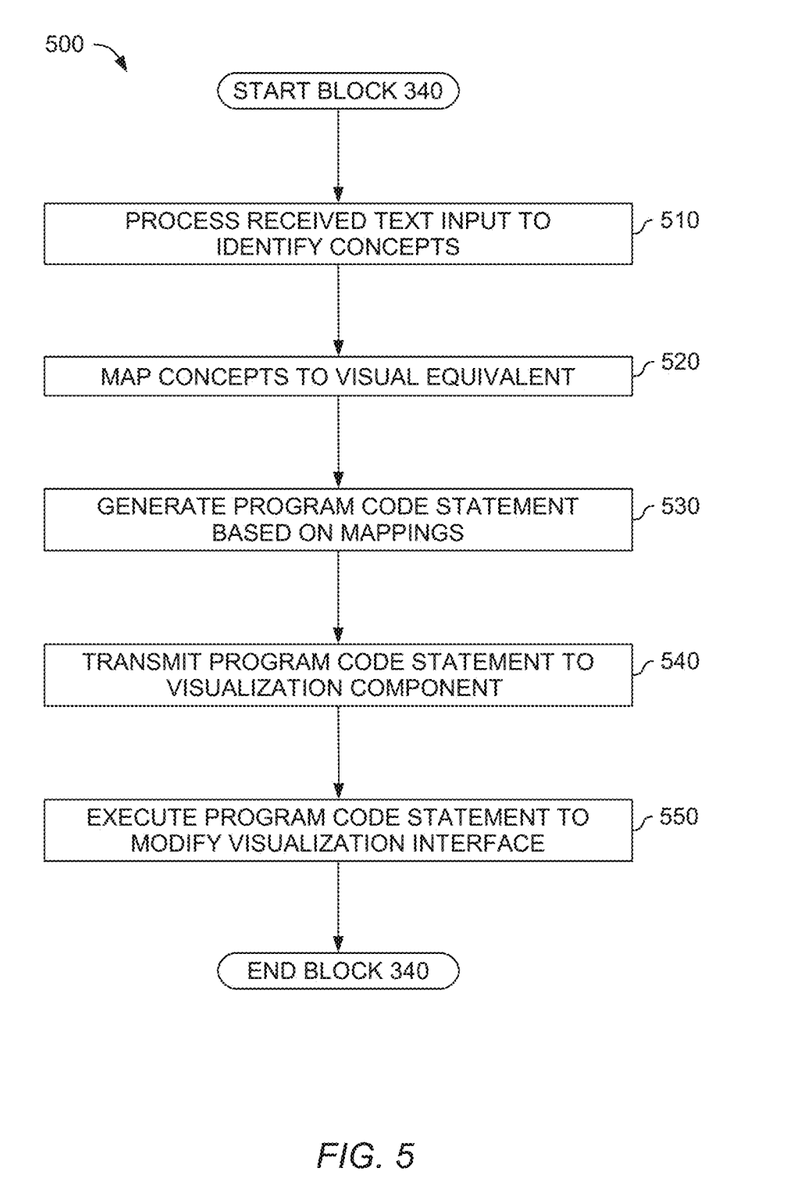
FIG. 5 is a flow chart illustrating an example method to translate text input to generate a statement to modify a visualization, according to one embodiment.

FIG. 5 is a flow chart illustrating an example method 500 corresponding to block 340 to translate text input to generate a statement to modify a visualization, according to one embodiment. As shown, the method 500 begins at block 510, where the classifiers 121 process the received text input to identify concepts therein. At block 520, the translation component 102 maps the concepts to a visual equivalent, e.g., based on the text-to-visualization ML models generated at block 430. At block 530, the translation component 102 may generate a program code statement based on the mappings determined at block 520. At block 540, the translation component 102 transmits the generated code statement to the visualization component 103. At block 550, the visualization component 103 executes the received code statement to modify the visualization interface 202.

Figure 6:
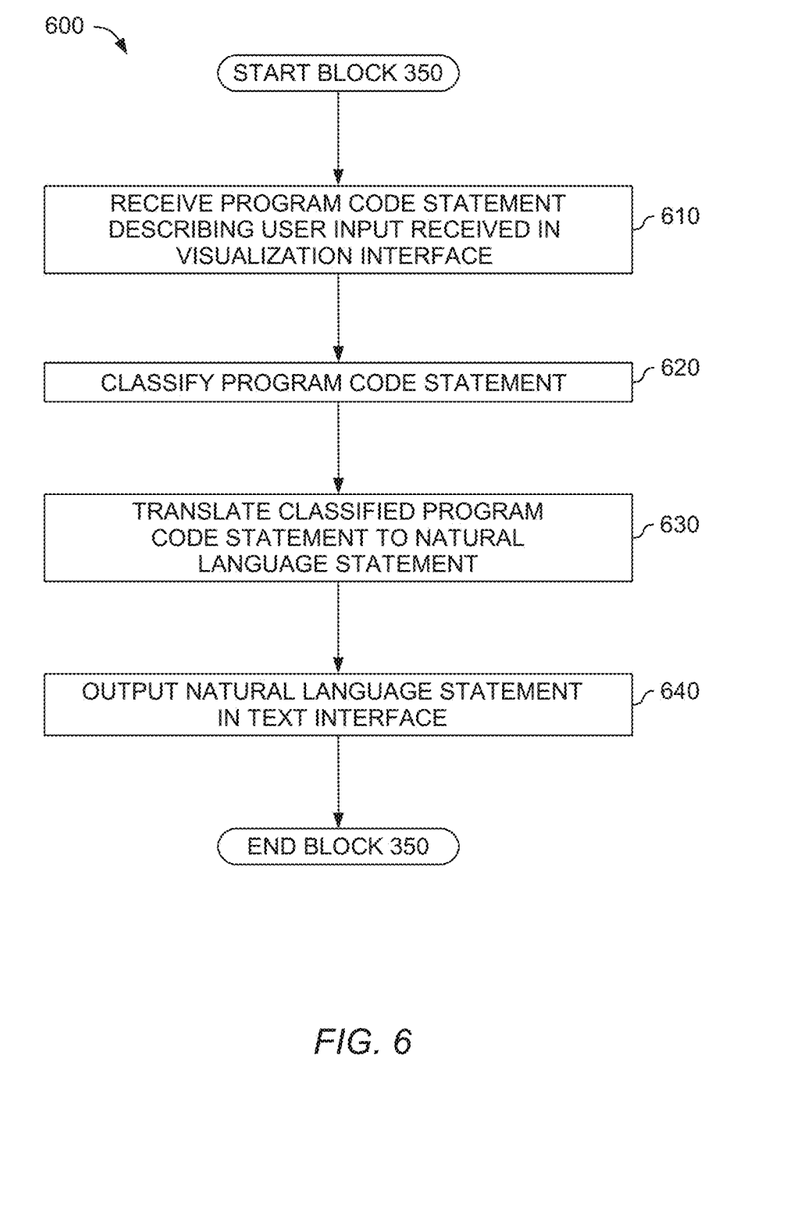
FIG. 6 is a flow chart illustrating an example method to translate user input received at a visualization interface to create a natural language statement, according to one embodiment.

FIG. 6 is a flow chart illustrating an example method 600 corresponding to block 350 to translate user input received at a visualization interface to create a natural language statement, according to one embodiment. As shown, the method 600 begins at block 610, where the translation component 102 receives a program code statement from the visualization component 103, where the program code statement describes the user input received via the visualization interface 202. At block 620, the translation component 102 uses a ML model to classify the program code statement. At block 630, the translation component 102 translates the classified program code statement to a natural language statement. At block 640, the chat engine 110 outputs the natural language statement via the chat interface 201.

Figure 7:
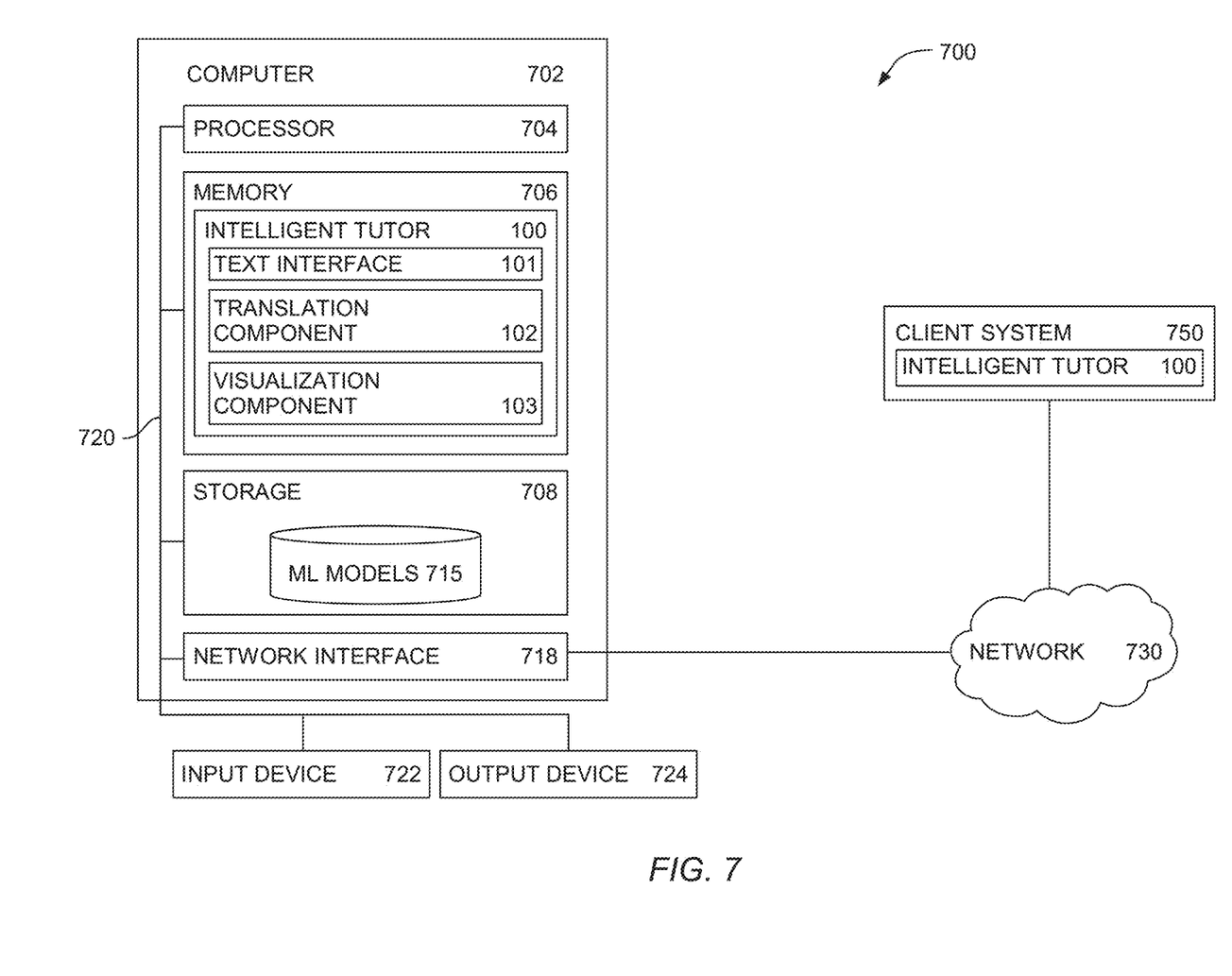
FIG. 7 is a block diagram illustrating an example system which provides an enhanced visual dialog interface for intelligent tutors, according to one embodiment.

FIG. 7 is a block diagram illustrating an example system 700 which provides an enhanced visual dialog system for intelligent tutors, according to one embodiment. The networked system 700 includes a computer 702. The computer 702 may also be connected to other computers (e.g., the client system 750) via a network 730. In general, the network 730 may be a telecommunications network and/or a wide area network (WAN). In a particular embodiment, the network 730 is the Internet.

The computer 702 generally includes a processor 704 which obtains instructions and data via a bus 720 from a memory 706 and/or a storage 708. The computer 702 may also include one or more network interface devices 718, input devices 722, and output devices 724 connected to the bus 720. The computer 702 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 704 is a programmable logic device that performs instruction, logic, and mathematical processing, and may be representative of one or more CPUs. The network interface device 718 may be any type of network communications device allowing the computer 702 to communicate with other computers via the network 730.

The storage 708 is representative of hard-disk drives, solid state drives, flash memory devices, optical media and the like. Generally, the storage 708 stores application programs and data for use by the computer 702. In addition, the memory 706 and the storage 708 may be considered to include memory physically located elsewhere; for example, on another computer coupled to the computer 702 via the bus 720.

The input device 722 may be any device for providing input to the computer 702. For example, a keyboard and/or a mouse may be used. The input device 722 represents a wide variety of input devices, including keyboards, mice, controllers, and so on. Furthermore, the input device 722 may include a set of buttons, switches or other physical device mechanisms for controlling the computer 702. The output device 724 may include output devices such as monitors, touch screen displays, and so on.

As shown, the memory 706 contains the intelligent tutor 101, described in greater detail above. As shown, the storage 708 contains the ML models 715, which stores any of the ML models described above. Generally, the system 700 is configured to implement all functionality described above with reference to FIGS. 1-6. The client system 750 is a user system which includes a user instance of the intelligent tutor 100. The user accesses the functionality of the intelligent tutor 100 via at least the GUIs 200-202 presented on a display device (not pictured) of the client system 750.

Advantageously, embodiments disclosed herein provide techniques to more tightly integrate different components of an intelligent tutor system. More specifically, embodiments disclosed herein translate user text and text generated by a chat bot in a chat interface to program code statements that modify a visualization interface of the intelligent tutor. Additionally, embodiments disclosed herein generate natural language statements based on the code statements that are generated responsive to user input modifying the visualization interface. Doing so improves the functionality of the intelligent tutor system, providing a greater learning experience to the user. Doing so also produces a model of user interaction that includes visuospatial elements as well as natural language, allowing data ingestion and training of machine learning models in non-spatial domains.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications or related data available in the cloud. For example, the intelligent tutor 100 could execute on a computing system in the cloud. In such a case, the intelligent tutor 100 may generate and store the ML models 715 at a storage location in the cloud. Doing so allows a user to access this information from any computing system attached to a network connected to the cloud (e.g., the Internet).

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   receiving natural language text input via a chat interface of a tutor application;
   identifying, using at least one classifier applied to the text input, a concept in the text input;
   mapping the concept in the text input to a first visual object currently displayed on a graphical user interface (GUI);
   upon mapping the concept in the text input to the first visual object, generating, based on a first machine learning (ML) model, a first program code statement corresponding to the first visual object, wherein the first program code statement is code in a machine-executable programming language;
   executing the first program code statement to modify a visualization interface of the tutor application based on the text input received via the chat interface by changing depiction of the first visual object on the GUI;
   receiving input requesting to modify the first visual object;
   generating a second program code statement to modify the first visual object based on the input;
   generating, by processing the second program code statement using a second ML model, a natural language statement describing the requested modification to the first visual object; and
   outputting the natural language statement via the chat interface.

2. The method of claim 1, wherein the first program code statement comprises a grammar of graphics statement, the method further comprising:
   outputting the visualization interface for display, wherein the visualization interface comprises a plurality of visual objects including the first visual object, wherein the program code statement modifies at least one of the plurality of visual objects.

3. The method of claim 2, further comprising:
   receiving input modifying a second visual object of the plurality of objects outputted for display via the visualization interface;
   generating a second program code statement to modify the second visual object;
   executing the second program code statement to modify the second visual object;
   generating, based on a second ML model, an entity corresponding to the second program code statement;
   generating, based on a mapping between the entity and a concept, a natural language statement; and
   outputting the natural language statement via the chat interface.

4. The method of claim 3, further comprising prior to receiving the text input:
   training the at least one classifier to generate the first and second machine learning models based on training data.

5. The method of claim 4, wherein the training data comprises: (i) a plurality of labeled program code statements used to generate natural language statements, and (ii) a plurality of labeled natural language statements used to generate program code statements.

6. The method of claim 1, further comprising:
   outputting, by a chat engine, a first message via the chat interface;
   classifying, by the at least one classifier applied to the first message, a concept in the first message;
   mapping the concept in the first message to an event associated with the concept in the first message;
   generating a second program code statement corresponding to the event associated with the concept in the first message; and
   executing the second program code statement to modify the visualization interface of the tutor application based on the first message outputted by the chat engine.

7. The method of claim 1, wherein the text input comprises a response to a question outputted via the chat interface.

8. A computer program product, comprising:
   a computer-readable storage medium having computer readable program code embodied therewith, the computer readable program code executable by a processor to perform an operation comprising:
   receiving natural language text input via a chat interface of a tutor application;
   identifying, using at least one classifier applied to the text input, a concept in the text input;
   mapping the concept in the text input to a first visual object currently displayed on a graphical user interface (GUI);
   upon mapping the concept in the text input to the first visual object, generating, based on a first machine learning (ML) model, a first program code statement corresponding to the first visual object, wherein the first program code statement is code in a machine-executable programming language;
   executing the first program code statement to modify a visualization interface of the tutor application based on the text input received via the chat interface by changing depiction of the first visual object on the GUI;
   receiving input requesting to modify the first visual object;
   generating a second program code statement to modify the first visual object based on the input;

generating, by processing the second program code statement using a second ML model, a natural language statement describing the requested modification to the first visual object; and outputting the natural language statement via the chat interface.

9. The computer program product of claim 8, wherein the first program code statement comprises a grammar of graphics statement, the operation further comprising:

outputting the visualization interface for display, wherein the visualization interface comprises a plurality of objects, wherein the program code statement modifies at least one of the plurality of objects.

10. The computer program product of claim 9, further comprising:

receiving input modifying at least one of the plurality of objects outputted for display via the visualization interface;

generating a second program code statement to modify the at least one of the plurality of objects;

executing the second program code statement to modify the at least one of the plurality of objects;

generating, based on a second ML model, an entity corresponding to the second program code statement;

generating, based on a mapping between the entity and a concept, a natural language statement; and outputting the natural language statement via the chat interface.

11. The computer program product of claim 10, the operation further comprising prior to receiving the text input:

training the at least one classifier to generate the first and second machine learning models based on training data.

12. The computer program product of claim 11, wherein the training data comprises: (i) a plurality of labeled program code statements used to generate natural language statements, and (ii) a plurality of labeled natural language statements used to generate program code statements.

13. The computer program product of claim 8, the operation further comprising:

outputting, by a chat engine, a first message via the chat interface;

classifying, by the at least one classifier applied to the first message, a concept in the first message;

mapping the concept in the first message to an event associated with the concept in the first message;

generating a second program code statement corresponding to the event associated with the concept in the first message; and executing the second program code statement to modify the visualization interface of the tutor application based on the first message outputted by the chat engine.

14. The computer program product of claim 8, wherein the text input comprises a response to a question outputted via the chat interface.

15. A system, comprising:

a processor; and a memory storing one or more instructions which, when executed by the processor, performs an operation comprising:

receiving natural language text input via a chat interface of a tutor application;

identifying, using at least one classifier applied to the text input, a concept in the text input;

mapping the concept in the text input to a first visual object currently displayed on a graphical user interface (GUI);

upon mapping the concept in the text input to the first visual object, generating, based on a first machine learning (ML) model, a first program code statement corresponding to the first visual object, wherein the first program code statement is code in a machine-executable programming language; and executing the first program code statement to modify a visualization interface of the tutor application based on the text input received via the chat interface by changing depiction of the first visual object on the GUI;

receiving input requesting to modify the first visual object;

generating a second program code statement to modify the first visual object based on the input;

generating, by processing the second program code statement using a second ML model, a natural language statement describing the requested modification to the first visual object; and outputting the natural language statement via the chat interface.

16. The system of claim 15, wherein the first program code statement comprises a grammar of graphics statement, the operation further comprising:

outputting the visualization interface for display, wherein the visualization interface comprises a plurality of objects, wherein the program code statement modifies at least one of the plurality of objects.

17. The system of claim 16, further comprising:

receiving input modifying at least one of the plurality of objects outputted for display via the visualization interface;

generating a second program code statement to modify the at least one of the plurality of objects;

executing the second program code statement to modify the at least one of the plurality of objects;

generating, based on a second ML model, an entity corresponding to the second program code statement;

generating, based on a mapping between the entity and a concept, a natural language statement; and outputting the natural language statement via the chat interface.

18. The system of claim 17, the operation further comprising prior to receiving the text input:

training the at least one classifier to generate the first and second machine learning models based on training data.

19. The system of claim 18, wherein the training data comprises: (i) a plurality of labeled program code statements used to generate natural language statements, and (ii) a plurality of labeled natural language statements used to generate program code statements.

20. The system of claim 15, wherein the text input comprises a response to a question outputted via the chat interface, the operation further comprising:

outputting, by a chat engine, a first message via the chat interface;

classifying, by the at least one classifier applied to the first message, a concept in the first message;

mapping the concept in the first message to an event associated with the concept in the first message;

generating a second program code statement corresponding to the event associated with the concept in the first message; and executing the second program code statement to modify the visualization interface of the tutor application based on the first message outputted by the chat engine.

* * * * *